US010346959B2

(12) United States Patent
Inoue et al.

(10) Patent No.: US 10,346,959 B2
(45) Date of Patent: Jul. 9, 2019

(54) PROCESSING APPARATUS, PROCESSING SYSTEM, IMAGE PICKUP APPARATUS, PROCESSING METHOD, AND NON-TRANSITORY COMPUTER-READABLE STORAGE MEDIUM

(71) Applicant: CANON KABUSHIKI KAISHA, Tokyo (JP)

(72) Inventors: Chiaki Inoue, Utsunomiya (JP); Yoshiaki Ida, Utsunomiya (JP); Yuichi Kusumi, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 124 days.

(21) Appl. No.: 15/443,093

(22) Filed: Feb. 27, 2017

(65) Prior Publication Data

US 2017/0262969 A1 Sep. 14, 2017

(30) Foreign Application Priority Data

Mar. 10, 2016 (JP) ................. 2016-046390

(51) Int. Cl.
G06T 5/00 (2006.01)
G06T 7/514 (2017.01)
H04N 5/235 (2006.01)
H04N 13/254 (2018.01)

(52) U.S. Cl.
CPC ............ *G06T 5/008* (2013.01); *G06T 7/514* (2017.01); *H04N 5/2351* (2013.01); *H04N 5/2354* (2013.01); *H04N 13/254* (2018.05); *G06T 2207/10016* (2013.01)

(58) Field of Classification Search
CPC .. H04N 9/3194; H04N 9/3155; H04N 9/3197; G09G 2320/0233
USPC ....... 382/154, 170, 211, 274, 275, 293, 307; 358/3.26, 3.27, 509, 520, 452
See application file for complete search history.

(56) References Cited

U.S. PATENT DOCUMENTS

| 6,043,797 | A | * | 3/2000 | Clifton | H04N 9/3147 345/589 |
| 6,707,553 | B1 | * | 3/2004 | Imura | G01J 3/10 356/402 |
| 7,027,160 | B2 | * | 4/2006 | Sperling | G01B 5/0004 356/446 |
| 7,081,957 | B2 | * | 7/2006 | Norton | G01N 21/55 250/372 |

(Continued)

FOREIGN PATENT DOCUMENTS

| JP | 2010122158 A | 6/2010 |
| JP | 2013185994 A | 9/2013 |

OTHER PUBLICATIONS

Matsushita, "Photometric Stereo", A research report of Information Processing Society of Japan, vol. 2011—CVIM-177, No. 29, pp. 1-12, May 20, 2011. English abstract provided. Cited in specification.

*Primary Examiner* — Yosef Kassa
(74) *Attorney, Agent, or Firm* — Rossi, Kimms & McDowell LLP

(57) ABSTRACT

A processing apparatus includes a corrector that, when the object is sequentially irradiated with light from three or more light sources with mutually different positions, corrects a light source condition to calculate surface normal information of an object on the basis of brightness of each of the light sources.

17 Claims, 8 Drawing Sheets

(56) References Cited

U.S. PATENT DOCUMENTS

| | | | | |
|---|---|---|---|---|
| 7,292,341 | B2* | 11/2007 | Brill | G01N 21/55 |
| | | | | 356/237.2 |
| 7,433,128 | B1* | 10/2008 | Tobiason | G01B 11/26 |
| | | | | 359/627 |
| 7,877,227 | B2* | 1/2011 | McDonnell | G01B 11/303 |
| | | | | 702/167 |
| 7,903,148 | B2* | 3/2011 | Yokoyama | H04N 5/213 |
| | | | | 348/222.1 |
| 8,050,515 | B2* | 11/2011 | Chen | G09G 5/10 |
| | | | | 382/254 |
| 8,167,439 | B2* | 5/2012 | Yamada | H04N 9/3155 |
| | | | | 348/743 |
| 8,256,900 | B2* | 9/2012 | Bitetto | G03B 21/006 |
| | | | | 353/28 |
| 8,654,140 | B2* | 2/2014 | Kanai | H04N 5/58 |
| | | | | 345/589 |
| 2014/0372075 | A1 | 12/2014 | Kojima et al. | |

\* cited by examiner

PROCESSING APPARATUS, PROCESSING SYSTEM, IMAGE PICKUP APPARATUS, PROCESSING METHOD, AND NON-TRANSITORY COMPUTER-READABLE STORAGE MEDIUM

BACKGROUND OF THE INVENTION

Field of the Invention

The present invention relates to a processing apparatus, a processing system, an image pickup apparatus, a processing method, and a non-transitory computer-readable storage medium.

Description of the Related Art

Obtaining more physical information regarding an object can generate images based on a physical model in image processing after imaging. For example, an image where visibility of the object is changed can be generated. Visibility of the object is determined on the basis of information such as shape information of the object, reflectance information of the object and light source information. As physical behavior of reflected light that is emitted from a light source and is reflected by the object depends on a local surface normal, using not a three-dimensional shape but surface normal information of the object as shape information is especially effective.

A photometric stereo method, in which reflectance characteristics of the object based on the surface normal of the object and a light source direction is assumed and the surface normal is calculated from luminance information of the object at a plurality of light source positions and the assumed reflectance characteristics, has been known (refer to "Photometric stereo" by Yasuyuki Matsushita, A research report of Information Processing Society of Japan, Vol. 2011-CVIM-177, No. 29, pp. 1-12, 2011). A Lambert reflection model in dependence upon a Lambert's cosine law is often used as the reflectance characteristics of the object.

In general, reflected light of the object has each component of specular reflected light and diffusion reflected light. The specular reflected light is regular reflection on an object surface, and indicates Fresnel reflection in dependence upon a Fresnel equation on the object surface (interface). The diffusion reflection light indicates light which is diffused into the object after transmitting through the object surface. As a specular reflection component is not expressed by the Lambert's cosine law, when reflected light from the object measured by an image pickup apparatus includes the specular reflection component, the surface normal cannot be calculated using the photometric stereo method accurately. Moreover, in shading parts which are not exposed to light from a light source, as deviation from the assumed reflection model occurs, the surface normal information of the object cannot be obtained accurately. For example, in Japanese Patent Laid-Open 2010-122158, a method to calculate a real surface normal from a plurality of surface normal candidates, which are obtained using four or more light sources, is disclosed.

To obtain the surface normal of the object using the photometric stereo method in the image pickup apparatus such as a digital camera, a plurality of images having different luminance information for each irradiation light source position are required. In the photometric stereo method, as it is assumed that a light quantity to be irradiated on the object is the same, when differences are generated in the irradiation light quantity among a plurality of light sources having different positions, the calculated surface normal largely deviates from the real surface normal. In "Photometric stereo" by Yasuyuki Matsushita, A research report of Information Processing Society of Japan, Vol. 2011-CVIM-177, No. 29, pp. 1-12, 2011 and Japanese Patent Laid-Open 2010-122158, response to influence due to the differences of the irradiation light quantity is not disclosed, and when the irradiation light quantity fluctuates for some reason, calculation accuracy of the surface normal deteriorates.

SUMMARY OF THE INVENTION

In view of the problem, an object of the present invention is to provide a processing apparatus, a processing system, an image pickup apparatus, a processing method, and a non-transitory computer-readable storage medium capable of maintaining calculation accuracy of a surface normal even if an irradiation light quantity fluctuates.

A processing apparatus according to one aspect of the present invention includes a corrector that, when an object is sequentially irradiated with light from three or more light sources with mutually different positions, corrects a light source condition to calculate surface normal information of the object on the basis of brightness of each of the light sources.

A processing system according to another aspect of the present invention includes a detector that, when an object is sequentially irradiated with light from three or more light sources with mutually different positions, detects brightness of each of the light sources, and a corrector that corrects a light source condition to calculate surface normal information of the object on the basis of a detection result of the detector.

An image pickup apparatus according to another aspect of the present invention includes an image pickup unit that, when an object is sequentially irradiated with light from three or more light sources with mutually different positions, images three or more images, a detector that detects brightness of each of the light sources during irradiation, a corrector that corrects a light source condition to calculate surface normal information of the object on the basis of a detection result of the detector, and a normal calculator that calculates the surface normal information on the basis of a plurality of pieces of luminance information of the three or more images.

A processing method according to another aspect of the present invention includes a step of, when an object is sequentially irradiated with light from three or more light sources with mutually different positions, correcting a light source condition to calculate surface normal information of the object on the basis of brightness of each of the light sources.

Further features of the present invention will become apparent from the following description of exemplary embodiments with reference to the attached drawings.

DESCRIPTION OF THE PREFERRED EMBODIMENTS

Figure 1:
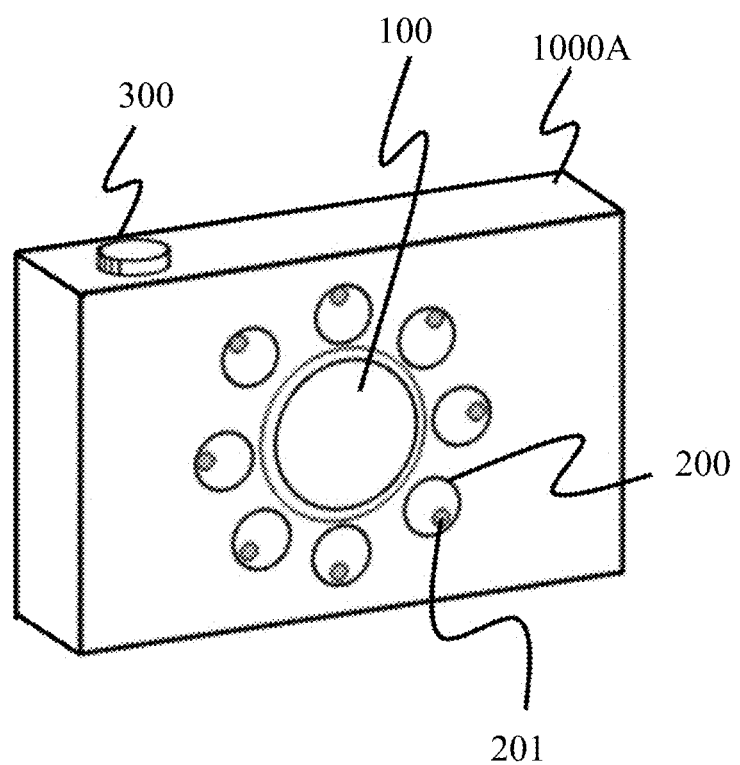
FIG. 1 is an appearance view of an image pickup apparatus according to an embodiment of the present invention (first, second and third examples).

Exemplary embodiments of the present invention will be described below with reference to the accompanied drawings. In each of the drawings, the same elements will be denoted by the same reference numerals and the duplicate descriptions thereof will be omitted.

Figure 9:
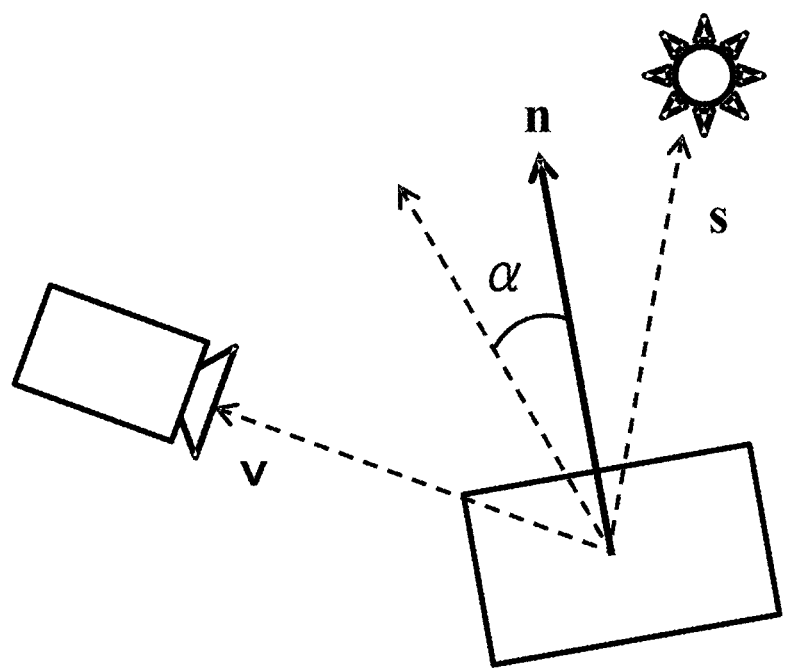
FIG. 9 is an explanatory diagram of a Torrance-Sparrow model.

In the photometric stereo method, reflectance characteristics of an object based on a surface normal of the object and a direction (a light source direction) from the object to a light source are assumed, and surface normal information is calculated from luminance information of the object at a plurality of light source positions and the assumed reflectance characteristics. When reflectance is not uniquely determined by receiving a predetermined surface normal and the light source position, the reflectance characteristics should be approximated using a Lambert reflection model in dependence upon a Lambert's cosine law. A specular reflection component, as illustrated in FIG. 9, depends on an angle α formed by a bisector of an angle between a light source vector s and a visual line direction vector v, and the surface normal n. Accordingly, the reflectance characteristics may be based on the visual line direction. Additionally, from the luminance information, influence by light such as environmental light other than light from the light source may be excluded by taking a difference between luminance of the object imaged in the case where the light source is lighted and luminance of the object imaged in the case where the light source is turned off.

Hereinafter, the reflectance characteristics assumed by the Lambert reflection model will be explained. When a luminance value of reflected light is i, Lambert diffuse reflectance of the object is pd, intensity of incident light is E, a unit vector (a light source vector) representing a direction (light source direction) from the object to the light source is s, and a unit surface normal vector of the object is n, the luminance value i is expressed by the following expression (1) on the basis of the Lambert's cosine law.

$$i = E\rho_d s \cdot n \quad (1)$$

When components of different M (M≥3) light source vectors are respectively defined as s1, s2, . . . , sM and luminance values for each component of the light source vectors are respectively defined as i1, i2, . . . , iM, the expression (1) is expressed by the following expression (2).

$$\begin{bmatrix} i_1 \\ \vdots \\ i_M \end{bmatrix} = \begin{bmatrix} s_1^T \\ \vdots \\ s_M^T \end{bmatrix} E\rho_d n \quad (2)$$

In the expression (2), the left side is a luminance vector expressed by a matrix of M row and 1 column, and a matrix [s1T, . . . sMT] and a symbol n of the right side are respectively an incident light matrix S of M row and 3 column representing the light source direction, and the unit surface normal vector expressed by a matrix of 3 row and 1 column. When the number M is equal to 3, a product Eρdn is expressed by the following expression (3) using an inverse matrix S−1 of the incident light matrix S.

$$E\rho_d n = S^{-1} \begin{bmatrix} i_1 \\ \vdots \\ i_M \end{bmatrix}$$

A norm of vectors of the left side of the expression (3) is a product of the intensity E of the incident light and the Lambert diffuse reflectance pd, and a normalized vector is calculated as a surface normal vector of the object. In other words, as the intensity E of the incident light and the Lambert diffuse reflectance pd are expressed as the product in the expression, when the product Eρd is considered as one variable, the expression (3) is regarded as simultaneous equations to determine unknown three variables with two freedom degrees of the unit surface normal vector n. Thus, obtaining the luminance information using at least three light source can determine each variable. When the incident light matrix S is not a regular matrix, an inverse matrix of the incident light matrix S does not exist and thus the components s1 to s3 of the incident light matrix S should be selected so that the incident light matrix S is the regular matrix. That is, the component s3 is preferably selected linearly independently with respect to the components s1 and s2.

Additionally, when the number M is larger than 3, conditions more than unknown variables are obtained and thus the unit surface normal vector n may be calculated from arbitrary selected three conditional expressions using the same method as the method in the case where the number M is equal to 3. When four or more conditional expressions are used, the incident light matrix S is not the regular matrix, and in this case, for example, an approximate solution may be calculated using a Moore-Penrose pseudo inverse matrix. The unit surface normal vector n may be also calculated using a fitting method or an optimization method.

When the reflectance characteristics are assumed by a model different from the Lambert reflection model, the conditional expression may differ from a linear equation for each component of the unit surface normal vector n. In this case, if the conditional expressions more than unknown variables are obtained, the fitting method or the optimization method can be used.

Moreover, when the number M is larger than 3, a plurality of conditions between 3 and M−1 are obtained and thus a plurality of solution candidates of the unit surface normal vector n can be calculated. In this case, a solution should be selected from the plurality of solution candidates using further another condition. For example, continuity of the unit surface normal n can be used as the condition. In calculating the unit surface normal n for each of pixels of the image pickup apparatus, when the surface normal in a pixel (x, y) is n(x, y) and a surface normal n(x−1, y) is known, a solution may be selected to minimize an evaluation function expressed by the following expression (4).

$$1 - n(x,y) \cdot n(x-1,y) \quad (4)$$

Furthermore, when surface normals n(x+1, y) and n(x, y±1) are known, a solution may be selected to minimize the following expression (5).

$$4-n(x,y)\cdot n(x-1,y)-n(x,y)\cdot n(x+1,y)-n(x,y)\cdot n(x,y-1)-n(x,y)\cdot n(x,y+1) \quad (5)$$

When a known surface normal does not exist and indefiniteness of the surface normal at each of all pixel positions exists, a solution may be selected to minimize a sum of all pixels of the expression (5) expressed by the following expression (6).

$$\sum_{x,y}\{4-n(x,y)\cdot n(x-1,y)-n(x,y)\cdot n(x+1,y)- \\ n(x,y)\cdot n(x,y-1)-n(x,y)\cdot n(x,y+1)\} \quad (6)$$

A surface normal in a pixel other than a nearest pixel or an evaluation function weighted according to a distance from a target pixel position may be also used.

In addition, as another condition, luminance information at an arbitrary light source position may be used. In a diffuse reflection model represented by the Lambert reflection model, luminance of reflected light increases with an approach of the unit surface normal vector and the light source direction vector. Accordingly, selecting a solution close to the light source direction vector having the largest luminance value of luminance values at a plurality of light source directions can determine the unit surface normal vector.

Alternatively, in a specular reflection model, when the light source vector is s and a unit vector (a visual line vector of a camera) of a direction from the object to the camera, the following expression (7) is satisfied.

$$s+v=2(v\cdot n)n \quad (7)$$

As expressed by the expression (7), when the light source vector s and the visual line vector of the camera v are known, the unit surface normal vector n can be calculated. When a surface has roughness, specular reflection has a spread of an emitting angle, but spreads near a solution calculated by assuming that the surface is smooth, and thus, a candidate near the solution with respect to the smooth surface from the plurality of solution candidates may be selected. Besides, a true solution may be determined using an average of the plurality of solution candidates.

First Example

Figure 2A:
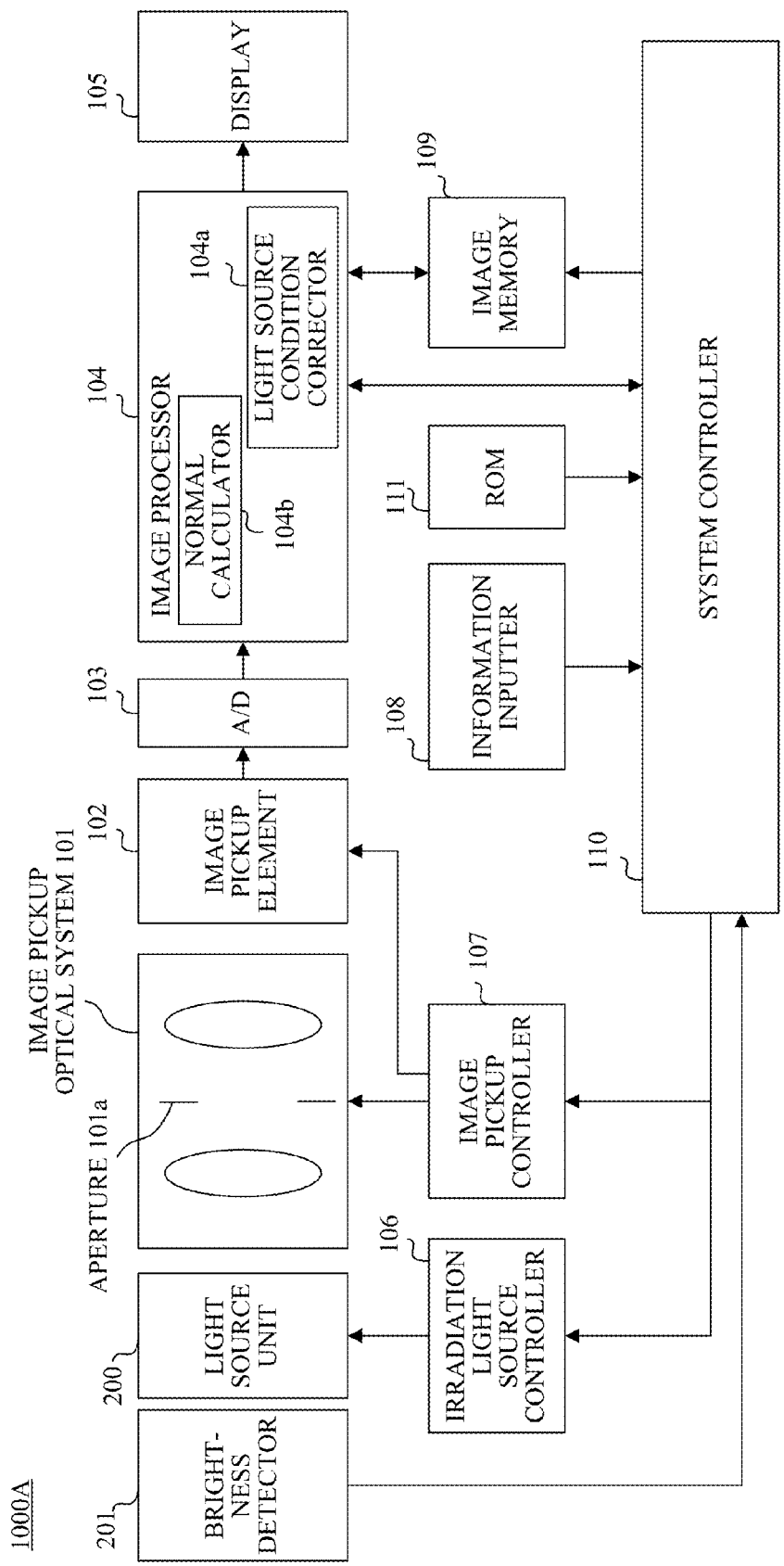
FIG. 2A is a block diagram of the image pickup apparatus according to the first example.

FIG. 1 is an appearance view of an image pickup apparatus 1000A according to this example, and FIG. 2A is a block diagram of the image pickup apparatus 1000A according to this example. The image pickup apparatus 1000A includes an image pickup unit 100 that images an object, and a light source unit 200. The image pickup unit 100 includes an image pickup optical system 101. In this example, the light source unit 200 includes eight light sources arranged at equal intervals in a concentric circle shape around an optical axis of the image pickup optical system 101. Each of the light sources includes a brightness detector (detector) 201 that detects brightness of each of the light sources. As the number of light sources necessary to perform the photometric stereo method are three, the light source unit 200 should include three or more light sources. Moreover, in this example, the light source unit 200 includes the plurality of light sources arranged at equal intervals in the concentric circle shape around the optical axis of the image pickup optical system 101, but the present invention is not limited to this. Additionally, in this example, the light source unit 200 is built in the image pickup apparatus 1000A, but may be detachably attached to the image pickup apparatus. A release button 300 is used to start photographing and autofocus.

Figure 3:
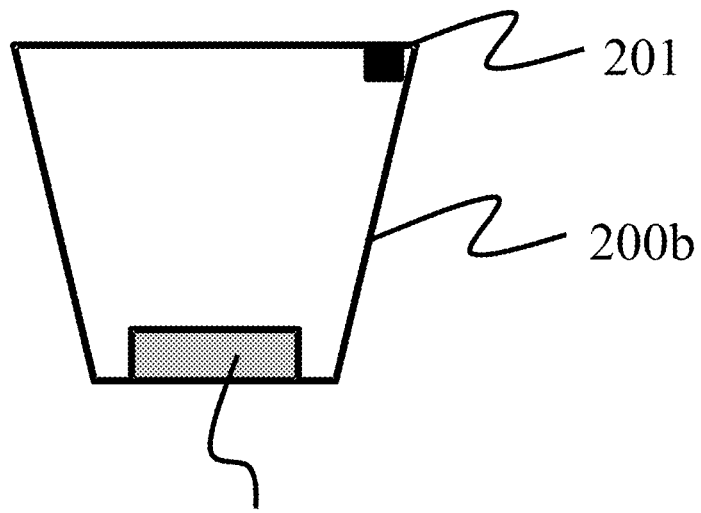
FIG. 3 is an explanatory diagram of a light source unit (the first and second examples).

FIG. 3 is an explanatory diagram of the light source unit 200. The light source unit 200 includes a light emitting part 200a and a housing 200b having the light emitting part 200a arranged at the bottom. In this example, a LED (Light Emitting Diode) is used as the light emitting part 200a, but a xenon lamp may be used. The brightness detector 201 is arranged so that a detection surface is arranged toward a side of the light emitting part 200a, and thus is not influenced by external light. Furthermore, when a light emitting quantity of the light emitting part 200a fluctuates due to a temperature change and aged deterioration, the brightness detector 201 detects light emitting quantity fluctuations (a ratio and a difference with respect to a reference light emitting quantity) of each of the light sources by detecting a luminance value of at least part of the light sources. In this example, each of the brightness detectors 201 detect the luminance value of each of the light sources, but, may detect a luminous quantity such as illuminance and luminance if the luminous quantity is necessary to estimate the light emitting quantity (irradiation light quantity) of each of the light sources. That is, the brightness of the present invention includes a physical quantity known as a general luminous quantity.

The image pickup optical system 101 includes an aperture 101a and forms an image of light from the object on the image pickup element 102. In this example, the image pickup optical system 101 is built in the image pickup apparatus 1000A, but may be detachably attached to the image pickup apparatus 1000A like a single-lens reflex camera. The image pickup element 102 is configured by a photoelectric conversion element such as a CCD sensor and a CMOS sensor, and images the object. An analog electrical signal generated by the photoelectric conversion of the image pickup element 102 is converted into a digital signal by an A/D convertor 103 and the digital signal is input to an image processor 104.

The image processor 104 performs general image processing to the digital signal and calculates surface normal information of the object. The surface normal information includes information to determine at least one or more candidates of one freedom degree of the surface normal, information to select a real solution from a plurality of solution candidates of the surface normal, and information regarding propriety of the obtained surface normal. The image processor 104 includes a light source condition corrector (corrector) 104a that corrects a light source condition to calculate the surface normal information on the basis of a detection result of the brightness detector 201, and a normal calculator 104b that calculates the surface normal information. An output image processed by the image processor 104 is stored in an image memory 109 such as a semiconductor memory and an optical disc. The output image may be also displayed by a display 105. In this embodiment, the light source condition corrector 104a and the normal calculator 104b are incorporated in the image pickup apparatus 1000A, but may be configured as a processing apparatus different from the image pickup apparatus 1000A.

An information inputter 108 supplies a system controller 110 with an image pickup condition (for example, an aperture value, an exposure time or a focal length) selected by a user. An irradiation light source controller 106 controls a light emitting state of the light source unit 200 depending on instructions from the system controller 110. An image pickup controller 107 obtains images on the desired image pickup condition selected by the user on the basis of information from the system controller 110. A ROM 111 stores various programs executed by the system controller 110 and data necessary for the programs. The ROM 111 also stores a table recording correcting values of the light source condition corresponding to each of the detection results of the brightness detector 201.

Figure 4:
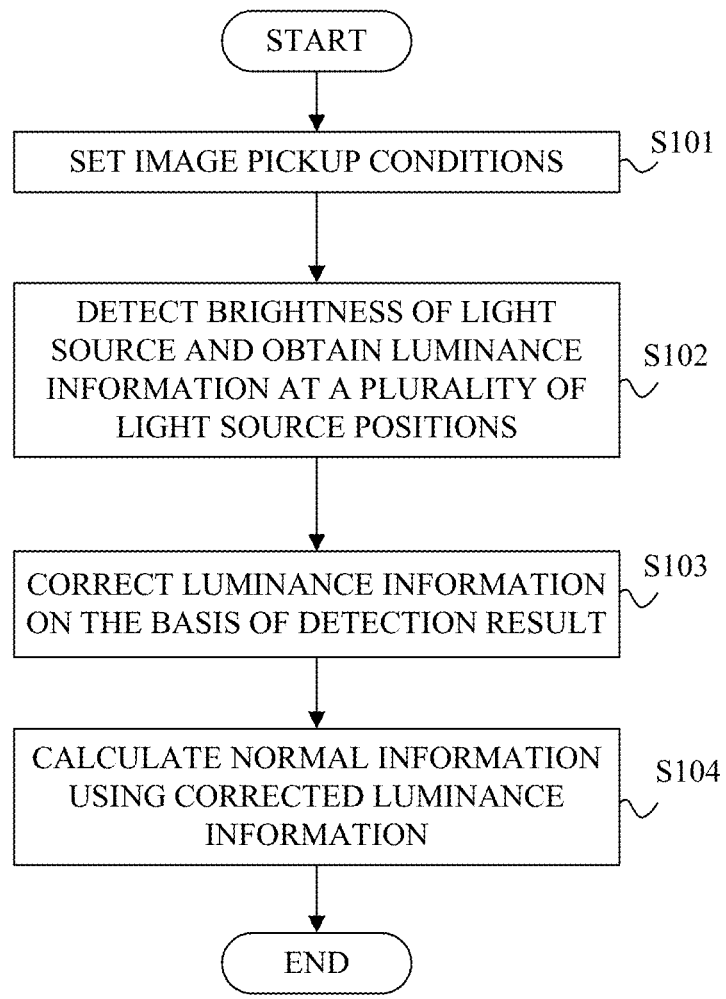
FIG. 4 is a flowchart illustrating surface normal information calculation processing according to the first example.

Surface normal information calculation processing according to this example will be explained in reference to a flowchart of FIG. 4. FIG. 4 is a flowchart illustrating the surface normal information calculation processing according to this example. The surface normal information calculation processing according to this example is executed by the system controller 110 and the image processor 104 in accordance with a processing program for allowing a computer to function as a processing apparatus. The processing program may be stored in, for example, a storage medium readable by a computer.

At step S101, the system controller 110 sets the image pickup condition (the aperture value, the exposure time or the focal length) set by the user from the information inputter 108.

At step S102, the system controller 110 works with a fully depressing operation of the release button 300 and performs imaging of the object at a plurality of light source positions on the basis of the image pickup condition set at step S101. Specifically, the system controller 110 sequentially irradiates the object with light from at least three or more light sources with mutually different positions of the light source unit 200 through the irradiation light source controller 106, and makes the image pickup unit 100 image through the image pickup controller 107. The A/D convertor 103 forms a photographic image (luminance information) by performing the A/D conversion of the analog signal output from the image pickup element 102, and outputs the photographic image to the image processor 104. Additionally, the brightness detector 201 detects at least part of luminance values of each of the light sources and, when the light emitting quantity of the light emitting part 200a of each of the light sources fluctuates due to a temperature change and aged deterioration, detects a fluctuation quantity of the light emitting quantity of each of the light sources. The image processor 104 may perform normal developing processing and various kinds of image correcting processing to generate the image.

At step S103, the system controller 110 makes the light source condition corrector 104a correct the luminance information obtained by imaging the object at the plurality of the light source positions on the basis of the detection result of the brightness detector 201. In the photometric stereo method, a precondition (light source condition) is that the light emitting quantity of each of the light sources is constant. Accordingly, when the light emitting part 200a of each of the light sources fluctuates due to a temperature change and aged deterioration, a difference is caused in the light emitting quantity among the plurality of light sources with different positions, the calculated surface normal largely deviates from the real surface normal. Thus, at this step, the light source condition corrector 104a corrects the luminance information obtained by imaging the object at each light source position on the basis of the detection result of the brightness detector 201 to virtually equalize the light emitting quantity of each of the light sources.

Below, the correction at this step in the case where only the light emitting quantity of a first light source of eight light sources fluctuates will be explained. As second to eighth light sources emit light normally and their light quantities are equal, the correction for them is not required. Moreover, for simplification, the luminance value detected by the brightness detector 201 directly indicates the light emitting quantity of each of the light sources.

Firstly, the brightness detector 201 detects the luminance value of the first light source lower than the luminance value of each of the other light sources. For example, the brightness detector 201 detects the luminance value, which is 50% with respect to the luminance value during normal light emission, of the first light source. Next, the system controller 110 obtains the detection result of the brightness detector 201, and outputs a correction signal based on the table, which records the correcting values of the light source conditions stored in the ROM 111, to the light source condition corrector 104a. Here, as the light emitting quantity of the first light source is a half of that of each of the other light sources, the system controller 110 outputs the correction signal for instructing to double the luminance value of the luminance information obtained by being irradiated with light from the first light source to the light source condition corrector 104a. Finally, the light source condition corrector 104a doubles the luminance value of the luminance information obtained by being irradiated with light from the first light source. By such a correction, the luminance information obtained by being irradiated with light from the first light source, which has the reduced light emitting quantity, can be virtually equaled to the illumination information obtained by being irradiated with light from the other light sources, which emit light normally. Thus, the luminance information, where all light sources have the same light emitting quantity virtually, can be obtained, and even if the light quantity of the light emitting part 200a fluctuates, deterioration of calculation accuracy of the can be suppressed.

In the above example, the luminance value detected by the brightness detector 201 indicates the light emitting quantity of each of the light sources directly, but may differ from all light emitting quantities of each of the light sources because the brightness detector 201 practically detects only a part of the luminance value of each of the light sources. Accordingly, a relative relation between the light emitting quantity of each of the light sources and the detection result of the brightness detector 201, which are preliminarily measured, is preferably reflected to the table, which records the correcting values of the light source conditions of the ROM 111. Additionally, the system controller 110 may use the same table for all light sources, or may use a different table for each of the light sources. Moreover, the light source conditions may be not a ratio of the luminance value with respect to the luminance value of the other light sources but a difference between the luminance values. In addition, the light source condition corrector 104a may correct not the luminance value of the luminance information obtained by being irradiated with light from the light source having small light emitting quantity but the luminance value of the luminance information obtained by being irradiated with light from the other light sources each having large light emitting quantity. Furthermore, when differences are caused in the light emitting quantity among the plurality of light sources, the light source condition corrector 104a may correct the luminance value of the luminance information obtained by being irradiated with light from the other light sources to suit the luminance value of the luminance information obtained by being irradiated with light form the reference light source.

At step S104, the system controller 110 makes the normal calculator 104b calculate the surface normal information on the basis of the luminance information corrected at step S103. The normal calculator 104b calculates the surface normal information using the above photometric stereo method. The image memory 109 stores the surface normal information and the image information, and the flow is completed.

As mentioned above, in this example, the luminance information obtained on each image pickup condition is corrected on the basis of the detection result of the brightness detector 201, which is provided in each light source, and thus calculation accuracy of the surface normal can be maintained even if the light emitting quantity of the light source fluctuates.

Figure 2B:
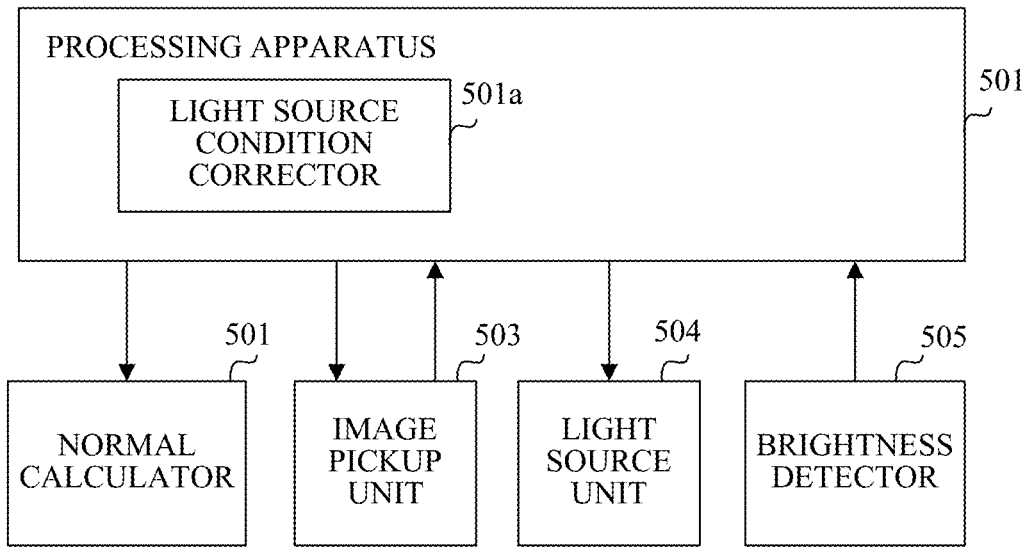
FIG. 2B is a block diagram of a processing system (the first, second and third examples).

In this example, the surface normal information of the object is calculated in the image pickup apparatus 1000A, but, as illustrated in FIG. 2B, may be calculated using a processing system 500 having a configuration different from that of the image pickup apparatus 1000A. The processing system 500 illustrated in FIG. 2B includes a processing apparatus 501, a normal calculator 502, an image pickup unit 503, a light source unit 504 and a brightness detector 505. The processing apparatus 501 includes a light source condition corrector 501a. When the processing system 500 calculates the surface normal information, first, the light source unit 504 irradiates the object with light from at least three or more light source positions, and the image pickup unit 503 images an image at each light source position. Then, the brightness detector 505 detects a luminance value of each of light sources. The brightness detector 505 may detect a temperature of each of the light sources. A light position may be determined by moving the light source unit 504 for each photographing when the light source unit 504 is consisted of one light source, and may be determined by changing the light source used for irradiation with light for each photographing when the light source unit 504 includes three or more light sources. Second, the light source condition corrector 501a corrects a luminance value of luminance information on the basis of a detection result of the brightness detector 505. Third, the normal calculator 502 calculates the surface normal information on the basis of the luminance information corrected by the light source condition corrector 501a. The processing system 500 may include at least the processing apparatus 501 and the brightness detector 505. The processing apparatus 501 may also include the normal calculator 502. Moreover, the image pickup unit 503 and the light source unit 504 may be individual apparatuses, and the light source unit 504 may be built in the image pickup unit 503.

Second Example

Figure 5:
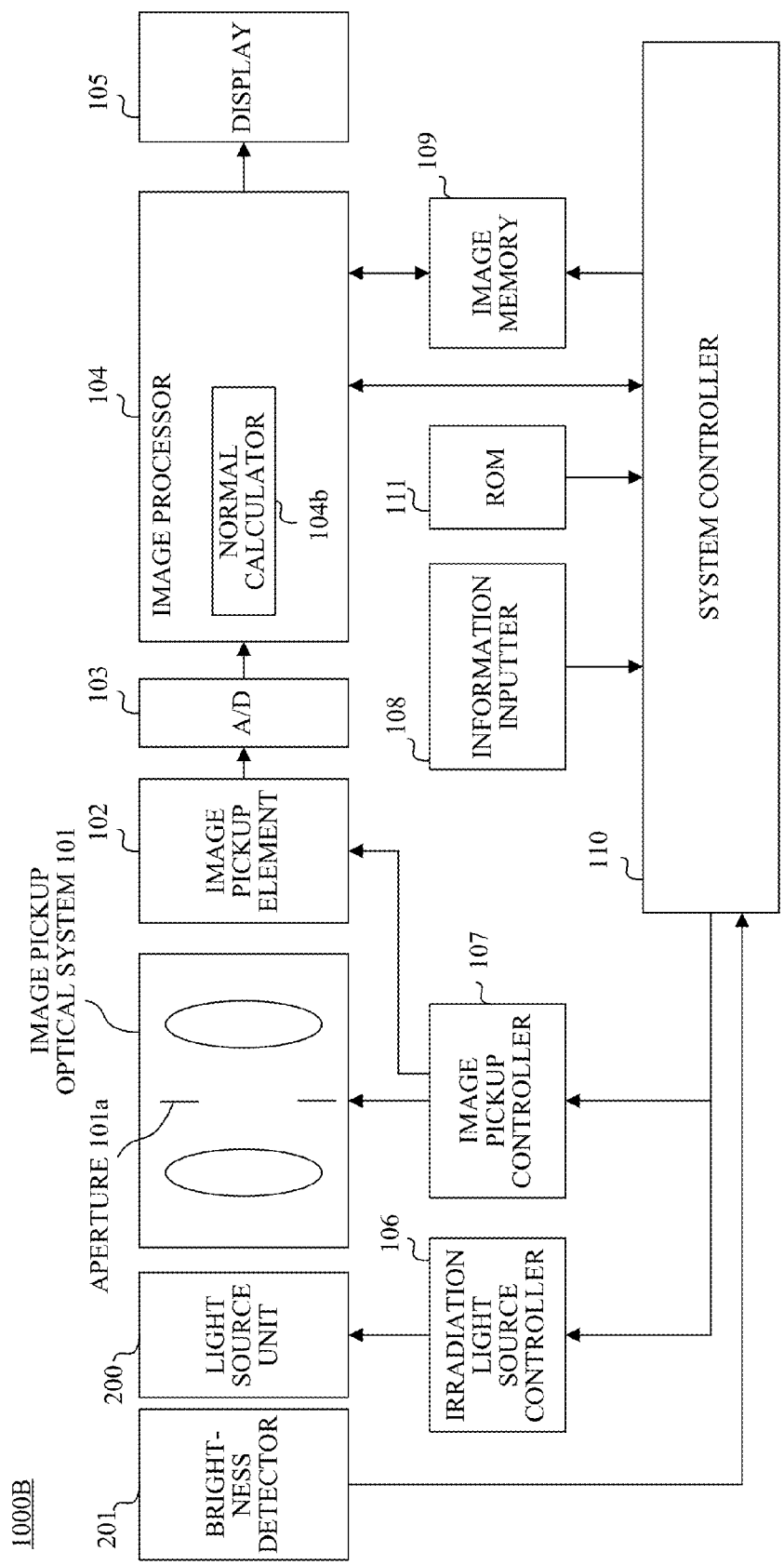
FIG. 5 is a block diagram of the image pickup apparatus according to the second example.

FIG. 5 is a block diagram of an image pickup apparatus 1000B according to this example. As an appearance configuration of the image pickup apparatus 1000B is similar to that of the image pickup apparatus 1000A according to the first example illustrated in FIG. 1, a detailed description of the appearance configuration will be omitted. Besides, as an internal configuration of the image pickup apparatus 1000B is similar to that of the image pickup apparatus 1000A except that the light source condition corrector 104a is not included, a detailed description of the internal configuration will be omitted, and only a part different from the image pickup apparatus 1000A will be explained.

The irradiation light source controller (corrector) 106 controls a light emitting state of the light source unit 200 in accordance with the instruction output from the system controller 110. The irradiation light source controller 106 also corrects brightness of the light source at the plurality of light source positions while photographing the object on the basis of the detection result of the brightness detector 201. As with the first example, instead of the irradiation light source controller 106, the light source condition corrector 104a, which is provided in the image processor 104, may correct brightness of the light source at the plurality of light source positions while photographing the object on the basis of the detection result of the brightness detector 201.

Figure 6:
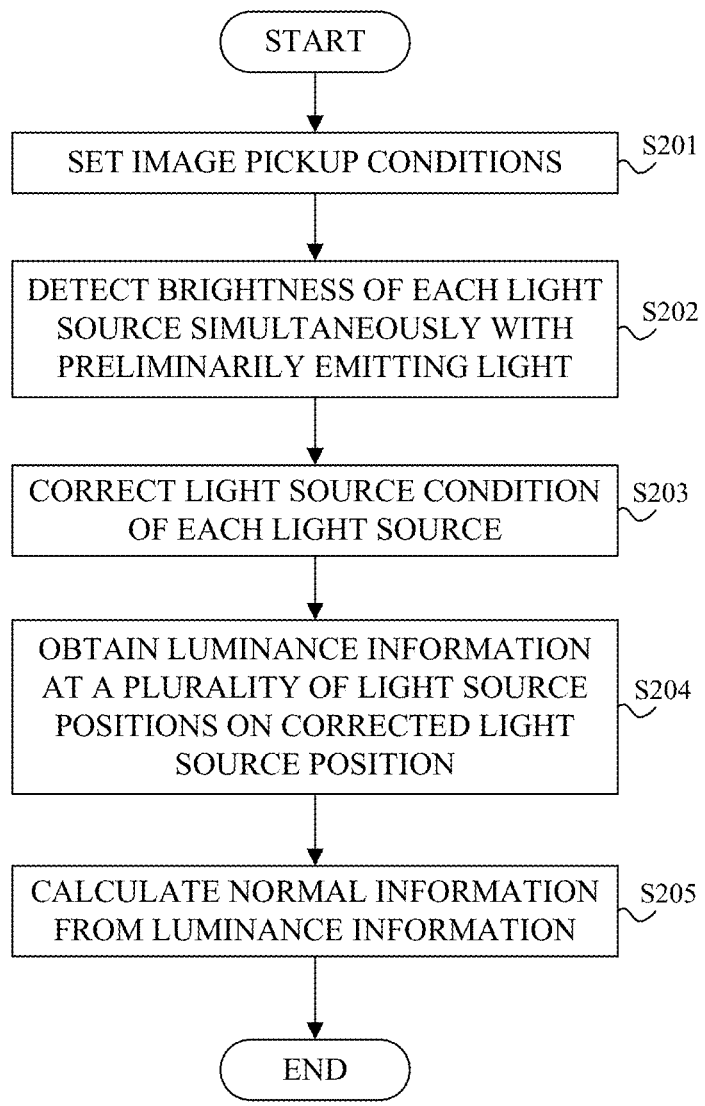
FIG. 6 is a flowchart illustrating surface normal information calculation processing according to the second example.

Surface normal information calculation processing according to this example will be explained in reference to a flowchart of FIG. 6. FIG. 6 is a flowchart illustrating the surface normal information calculation processing according to this example. The surface normal information calculation processing according to this example is executed by the system controller 110 and the image processor 104 in accordance with a processing program for allowing a computer to function as a processing apparatus. The processing program may be stored in, for example, a storage medium readable by a computer.

At step S201, the system controller 110 sets an image pickup condition (an aperture value, an exposure time or a focal length) set by the user from the information inputter 108.

At step S202, the system controller 110 works with a half depressing operation of the release button 300, makes the image pickup apparatus 1000B a photographing preparation state, and controls each light source to preliminarily emit light on the image pickup condition set at step S201. At the same time, the brightness detector 201 detects at least part of luminance values of each of the light sources, and, when the light emitting quantity of the light emitting part 200a of each of the light sources fluctuates due to a temperature change and aged deterioration, detects a fluctuation quantity of the light emitting quantity of each of the light sources.

At step S203, the system controller 110 makes the irradiation light source controller 106 correct the light emitting quantity (light source condition) of each light source by controlling an irradiation light source controlling value on the basis of the detection result of the brightness detector 201. In this example, the irradiation light source controller 106 controls a current value, which is applied to each light source, to correct the light emitting quantity of each light source. If the light emitting quantity of each light source can be corrected, the irradiation light source controller 106 may control the other irradiation light source controlling value (for example, a temperature of the light source and a voltage applied to the light source). In the photometric stereo method, a precondition (light source condition) is that the light emitting quantity of each of the light sources is constant. Accordingly, when a difference is caused in the light emitting quantity among the plurality of light sources with different positions by fluctuation of the light emitting quantity of the light emitting part 200a of each of the light sources due to a temperature change and the deterioration, the calculated surface normal largely deviates from the real surface normal. Thus, at this step, the irradiation light source controller 106 corrects the light emitting quantity of each of the light sources on the basis of the detection result of the brightness detector 201 to equalize the light emitting quantity of each of the light sources while photographing the object at each light source position.

Below, in the case where only the light emitting quantity of a first light source of eight light sources fluctuates, a correction method that the light emitting quantity of the first light source is equal to that of each of the other light sources will be explained. As second to eighth light sources emit light normally and their light quantities are equal, the correction for them is not required. Moreover, for simplification, the luminance value detected by the brightness detector 201 directly indicates the light emitting quantity of each of the light sources.

Firstly, the brightness detector 201 detects the luminance value of the first light source lower than the luminance value of each of the other light sources. For example, the brightness detector 201 detects the luminance value, which is 50% with respect to the luminance value during normal light emission, of the first light source. Next, the system controller 110 obtains the detection result of the brightness detector 201, and outputs a correction signal based on the table, which records the correcting values of the light source conditions stored in the ROM 111, to the irradiation light source controller 106. Here, as the light emitting quantity of the first light source is a half of the light emitting quantity of each of the other light sources, the system controller 110 outputs the correction signal for instructing to double a current value applied to the first light source to the irradiation light source controller 106. Finally, the irradiation light source controller 106 doubles the current value applied to the first light source. By such a correction, the light emitting quantity, which decreases while preliminarily emitting light, of the first light source can be equal to the light emitting quantity of each of the other light sources, which emit light normally. Thus, the luminance information, where all light sources have the same light emitting quantity virtually, can be obtained, and even if the light quantity of the light emitting part 200a fluctuates, deterioration of calculation accuracy of the can be suppressed.

In the above example, the luminance value detected by the brightness detector 201 indicates the light emitting quantity of each of the light sources directly, but may differ from all light emitting quantities of each of the light sources because the brightness detector 201 practically detects only a part of the luminance value of each of the light sources. Accordingly, a relative relation between the light emitting quantity of each of the light sources and the detection result of the brightness detector 201, which are preliminarily measured, is preferably reflected to the table, which records the correcting values of the light source conditions stored in the ROM 111. Additionally, the system controller 110 may use the same table for all light sources, or may use a different table for each of the light sources. Moreover, the irradiation light source controller 106 corrects the current value applied to the light source, which has a small light emitting quantity, to be equal to the light emitting quantity of all light sources, but may correct a current value applied to the other light sources, which have a large light emitting quantity. Especially, when the current value applied to the light source cannot be increased due to aged deterioration of the light source and structural deficiency, the current value applied to the other light sources having the large light emitting quantity is preferably corrected.

At step S204, the system controller 110 works with a fully depressing operation of the release button 300, and performs imaging of the object at a plurality of light source positions using a first image pickup condition. Then, the A/D convertor 103 forms a photographic image (luminance information) by performing the A/D conversion of the analog signal output from the image pickup element 102, and outputs the photographic image to the image processor 104. The image processor 104 may perform normal developing processing and various kinds of image correcting processing to generate the image.

At step S205, the system controller 110 makes the normal calculator 104b calculate the surface normal information on the basis of the luminance information obtained at step S204. The normal calculator 104b calculates the surface normal information using the above photometric stereo method. The image memory 109 stores the surface normal information and the image information, and the flow is completed.

As mentioned above, in this example, the light emitting quantity of each light source is corrected on the basis of the detection result of the brightness detector 201, which is provided in each light source, while preliminarily emitting light, and thus, even if the light emitting quantity of the light source fluctuates, calculation accuracy of the surface normal can be maintained.

In this embodiment, the surface normal information of the object is calculated in the image pickup apparatus 1000B, but may be calculated using the processing system 500 illustrated in FIG. 2B. In this case, the light source condition corrector 501a provided in the processing system 500 may correct the light source condition.

Third Example

Figure 7:
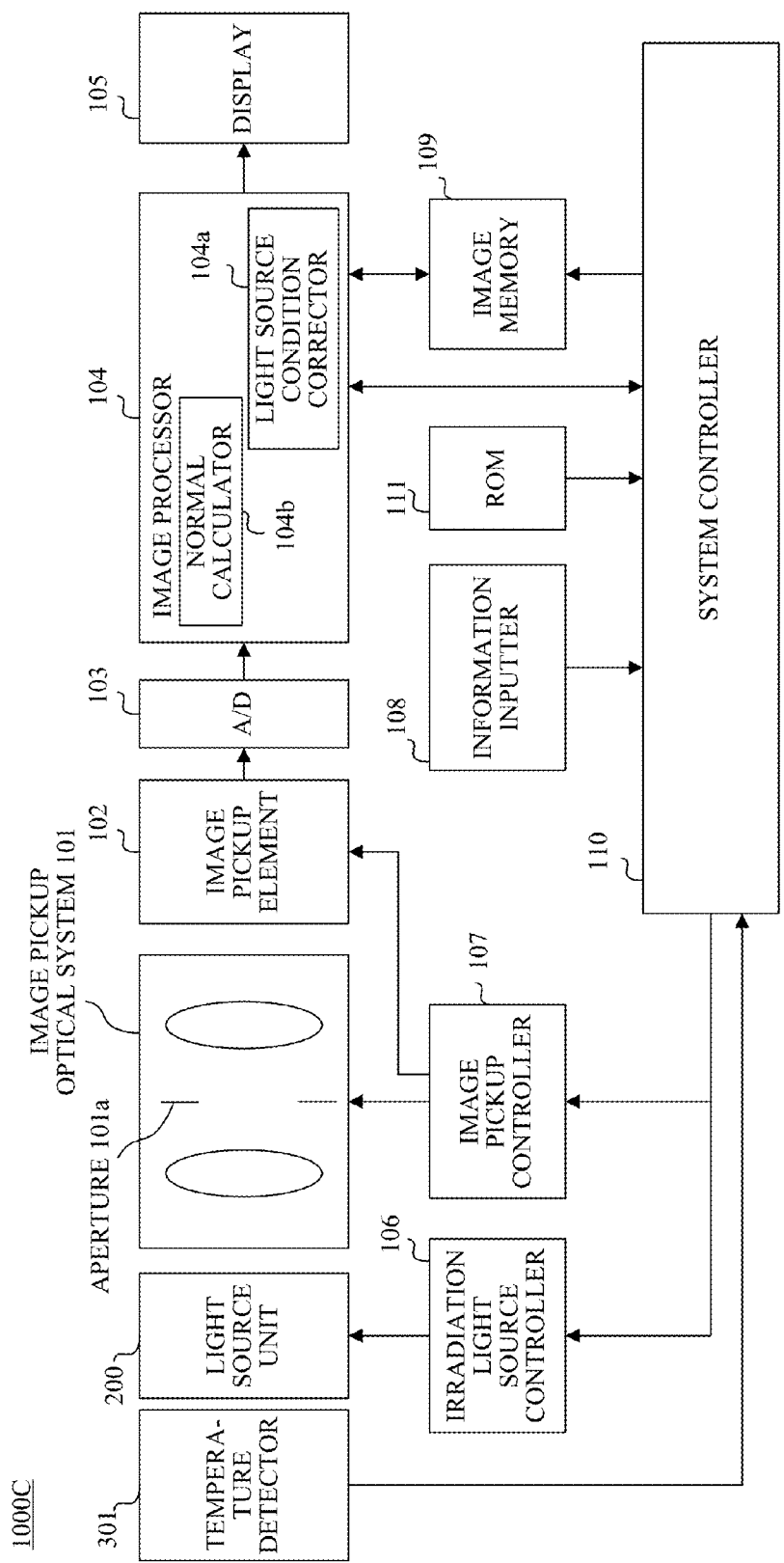
FIG. 7 is a block diagram of the image pickup apparatus according to the third example.

FIG. 7 is a block diagram of an image pickup apparatus 1000C according to this example. As an appearance configuration of the image pickup apparatus 1000C is similar to that of the image pickup apparatus 1000A according to the first example illustrated in FIG. 1, a detailed description of the appearance configuration will be omitted. Besides, as an internal configuration of the image pickup apparatus 1000C is similar to that of the image pickup apparatus 1000A illustrated in FIG. 2A except that a temperature detector 301 is used instead of the brightness detector 201, a detailed description of the internal configuration will be omitted, and only a part different from the image pickup apparatus 1000A will be explained.

Figure 8:
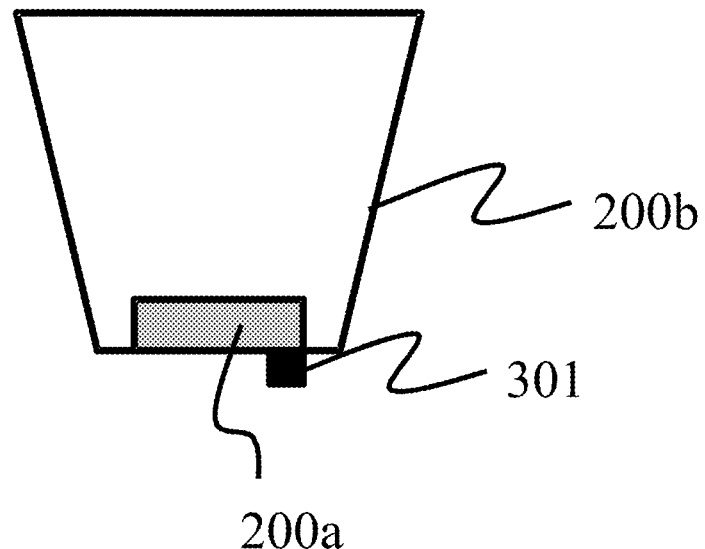
FIG. 8 is an explanatory diagram of a light source unit (the third example).

FIG. 8 is an explanatory of the light source unit 200. The light source unit 200 includes the light emitting part 200a and the housing 200b having the light emitting part 200a arranged at the bottom. In this example, a LED (Light Emitting Diode) is used as the light emitting part 200a, but a xenon lamp may be used. Each light source includes the temperature detector (detector) 301 that is arranged near the light emitting light part 200a and that detects a temperature of the light emitting part 200a. The light emitting quantity of the LED used as the light emitting part 200a is affected by a temperature and an applied current, and thus detecting the temperature of the light emitting part 200a using the temperature detector 301 is equal to detecting the light emitting quantity of each light source. That is, the temperature detector 301 is considered a type of brightness detector.

Additionally, in this example, the ROM 111 stores various programs executed by the system controller 110, data necessary for the programs, and a table recording the correcting values of the light source conditions according to the detection result of the temperature detector 301. Moreover, a relative relation between the light emitting quantity of each of the light sources and the detection result of the temperature detector 301, which are preliminarily measured, is preferably reflected to the table, which records the correcting values of the light source conditions of the ROM 111. Furthermore, the ROM 111 may store one table used for all light sources, or may store a different table for each of the light sources.

The system controller 110 and the image processor 104 can calculate the surface normal information using the flow of the first or second example. The light source condition is corrected by the light source condition corrector 104a in the case where the flow of the first example is used, or by the irradiation light source controller 106 in the case where the flow of the second example is used.

As mentioned above, in this example, each light source includes the temperature detector 301, and the luminance information, which is obtained on each image pickup condition, or the light emitting quantity of each light source is corrected on the basis of the detection result of the temperature detector 301. Thus, even if the light emitting quantity of the light source fluctuates, calculation accuracy of the surface normal can be maintained.

In this embodiment, the surface normal information of the object is calculated in the image pickup apparatus 1000C, but may be calculated using the processing system 500 illustrated in FIG. 2B.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions. In the first and second examples, the luminance information and the light emitting quantity of the light source are corrected to correct the light source condition, but the present invention is not limited to this. For example, color information such as a color temperature and a light emitting wavelength may be corrected.

This application claims the benefit of Japanese Patent Application No. 2016-046390, filed on Mar. 10, 2016, which is hereby incorporated by reference herein in its entirety.

What is claimed is:

1. A processing apparatus comprising a corrector that, when an object is sequentially irradiated with light from three or more light sources with mutually different positions to calculate surface normal information of the object, corrects a light source condition based on brightness of each of the light sources so that the surface normal information is calculated in a condition where the light sources are equal in brightness.

2. The processing apparatus according to claim 1, wherein the corrector corrects at least one luminance information among a plurality of pieces of luminance information of three or more images, which are imaged while the object is sequentially irradiated with light from the light sources, to virtually equalize brightness of each of the light sources.

3. The processing apparatus according to claim 1, wherein the corrector corrects brightness of at least one of the light sources to equalize brightness of each of the light sources.

4. The processing apparatus according to claim 3, wherein the corrector corrects brightness of at least one of the light sources by controlling a current value applied to the at least one of the light sources.

5. The processing apparatus according to claim 1, further comprising a normal calculator that calculates the surface normal information on the basis of a plurality of pieces of luminance information of three images, which are imaged while the object is sequentially irradiated with light from the light sources.

6. The processing apparatus according to claim 5, wherein the normal calculator calculates the surface normal information on the basis of a plurality of pieces of luminance information, at least one of which is corrected by the corrector, of the three or more images, or on the basis of a plurality of pieces of luminance information of the three or more images, which are imaged while the object is sequentially irradiated with light from the light sources, at least one of whose brightness is corrected by the corrector.

7. The processing apparatus according to claim 1, wherein the corrector corrects conditions regarding the other light sources on the basis of brightness of a light source having the smallest brightness among the light sources.

8. A processing system comprising:
   a detector that, when an object is sequentially irradiated with light from light sources with mutually different positions to calculate surface normal information of the object, detects brightness of each of the light sources; and
   a corrector that corrects a light source condition based on brightness of each of the light sources so that the surface normal information is calculated in a condition where the light sources are equal in brightness.

9. The processing system according to claim 8, wherein the detector detects brightness of each of the light sources by detecting a luminance value of each of the light sources.

10. The processing system according to claim 8, wherein the detector detects brightness of each of the light sources by detecting a temperature of each of the light sources.

11. The processing system according to claim 8, further comprising a light source unit including the light sources.

12. An image pickup apparatus comprising:
   an image pickup unit that captures three or more images when an object is sequentially irradiated with light from light sources with mutually different positions;
   a detector that detects brightness of each of the light sources during irradiation;
   a corrector that corrects a light source condition based on brightness of each of the light sources; and
   a normal calculator that calculates the surface normal information on the basis of a plurality of pieces of luminance information of the three or more images
   wherein the corrector corrects the light source condition so that the surface normal information is calculated by the normal calculator in a condition where the light sources are equal in brightness.

13. The image pickup apparatus according to claim 12, further comprising a light source unit including the light sources.

14. A processing method comprising a step of, when an object is sequentially irradiated with light from light sources with mutually different positions to calculate surface normal information of the object, correcting a light source condition based on brightness of each of the light sources so that the surface normal information is calculated in a condition where the light sources are equal in brightness.

15. A non-transitory computer-readable storage medium configured to store a computer program that enables a computer to function as a processing apparatus according to claim 1.

16. The processing apparatus according to claim 1, wherein the surface normal information includes information to determine at least one or more candidates of one freedom degree of the surface normal.

17. The processing apparatus according to claim 1, wherein the object is a three-dimensional object.

* * * * *